May 22, 1951
P. L. VISSAT
2,554,076
SELF-CENTERING SUPPORT FOR HEATING MEANS
Filed Aug. 17, 1946
2 Sheets-Sheet 1
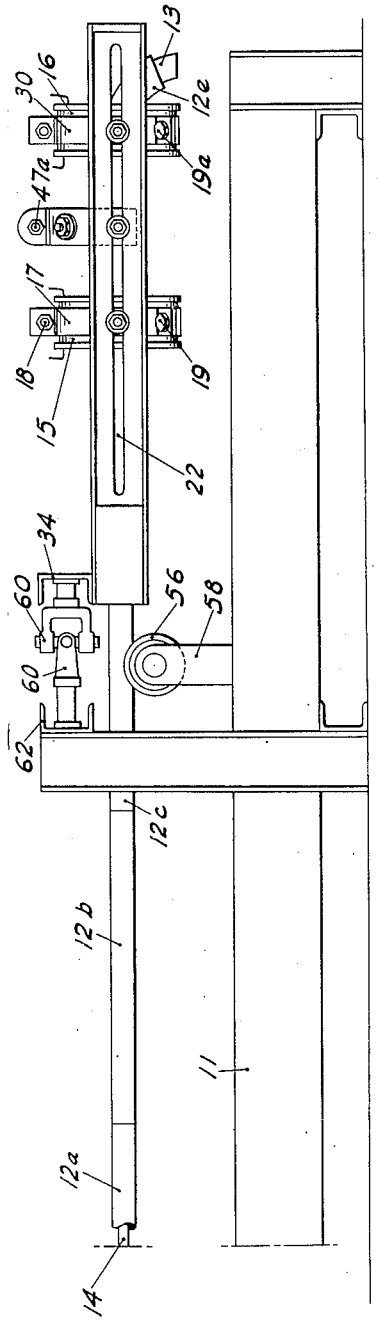
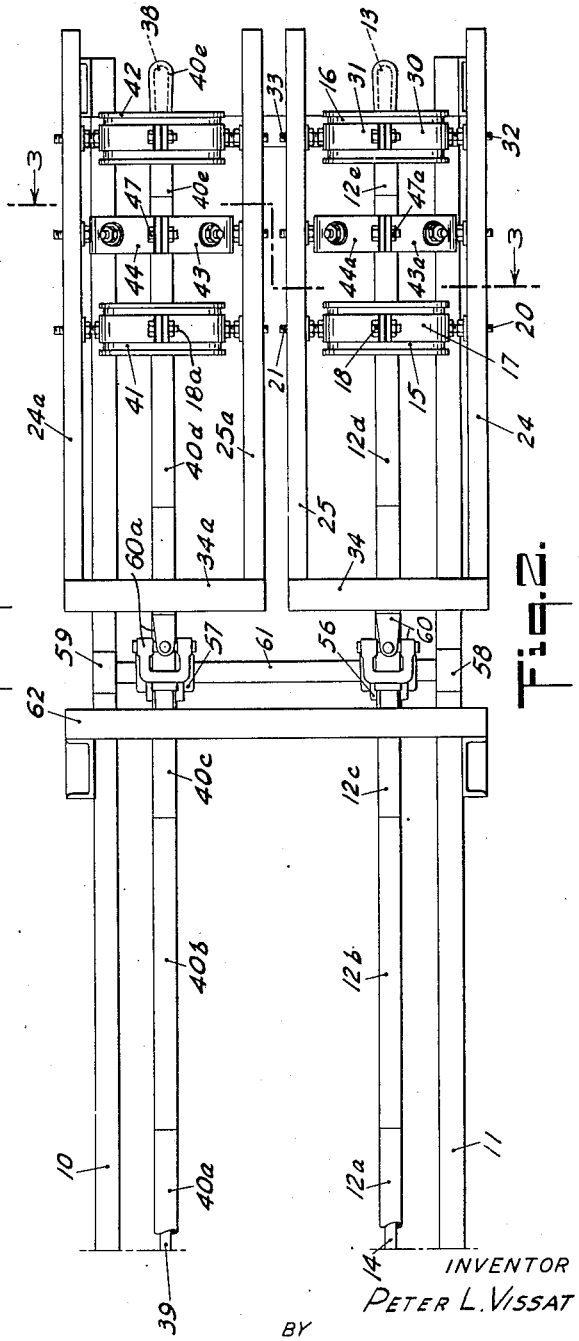
INVENTOR
PETER L. VISSAT
BY
Woodcock and Phelan
ATTORNEYS

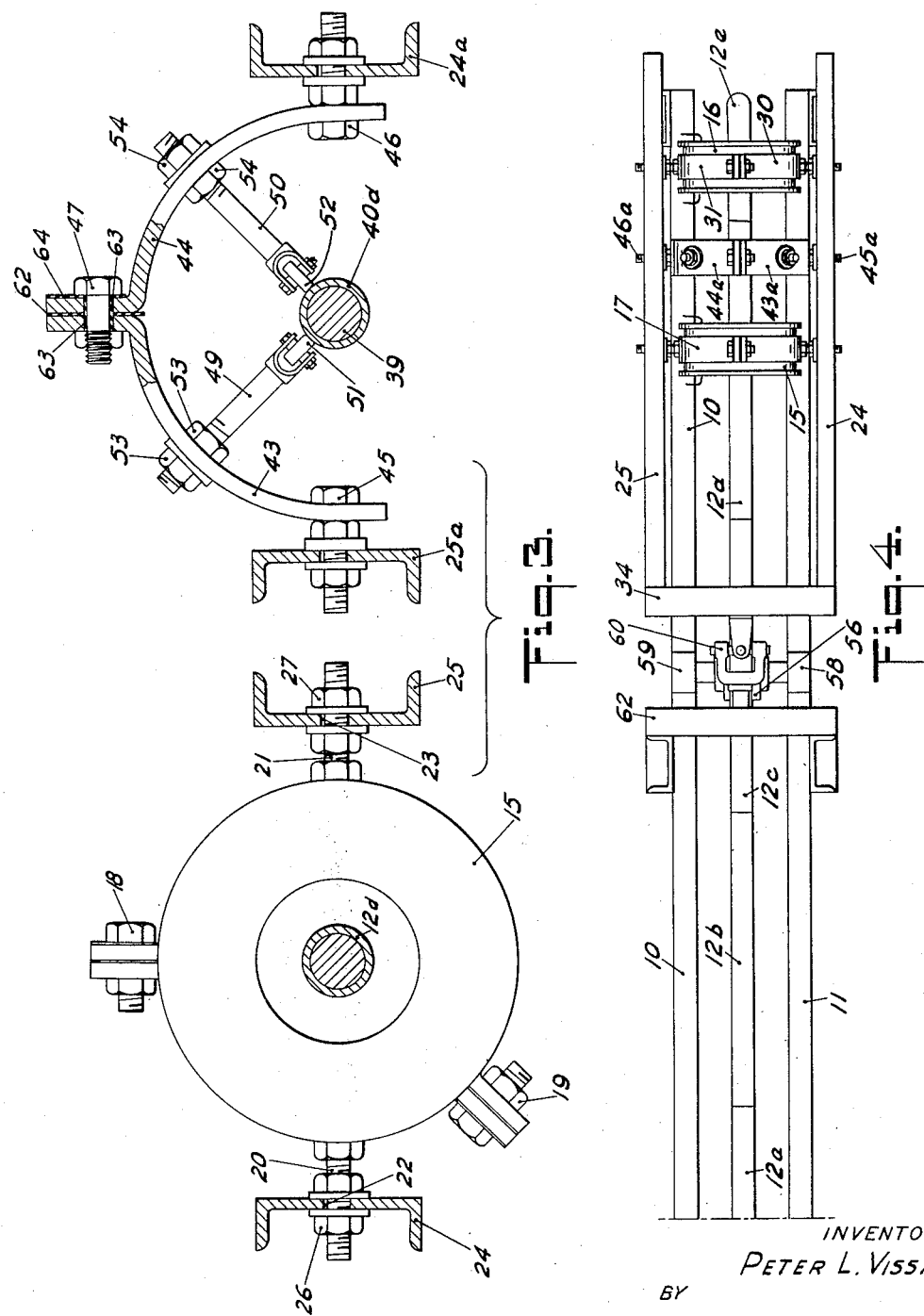

Patented May 22, 1951

2,554,076

UNITED STATES PATENT OFFICE 2,554,076

SELF-CENTERING SUPPORT FOR HEATING MEANS

Peter L. Vissat, Louisville, Ky., assignor to Tube Turns, Inc., a corporation of Kentucky Application August 17, 1946, Serial No. 691,252

7 Claims. (Cl. 219—47)

1

This case relates to electrical heating systems of the type suitable for elevating the temperature of elongated members such as tubes, and has for an object the provision of a mounting means for a heating coil which will maintain uniform spacing between the coil and the member, regardless of deviation in the path of movement of the member.

The present invention is particularly suitable for induction heating systems of the type disclosed in Bennett Patent No. 2,480,315. The said Bennett patent includes an apparatus for making tube bends and the like, which apparatus is similar to those disclosed in Gaum Patent No. 2,176,961 and Zoeller Patent No. 2,246,029. Instead of the gas furnaces disclosed by said patents, there is disclosed in said Bennett patent a method and means by which tube blanks may be electrically heated at such high rates as to permit them to be shaped at high speed into pipe or tube fittings. The tube blanks are shaped by being forced over a mandrel while at a plastic temperature. Since the tube blanks are subjected to relatively high forces, there is a tendency, at times, for the tube blanks, the mandrel, and the associated tie-rod to move about. Where a heating coil is rigidly supported adjacent the tube blanks, in the absence of the present invention, relative movement between them changes the spacing with reference to the coil, and in some cases the coil may be actually injured by contact with the hot tube blanks.

In carrying out the present invention in one form thereof, the heating coils are supported from the tube blanks themselves, a universal-joint connection being arranged to prevent axial displacement of the coil with reference to the tube blank and to insure movement of the coil with the tube blank in all radial directions. A constant predetermined positional relationship between the tube blank and the coil thereby is maintained. Provisions are also made to minimize inductive heating of the coil support, a matter of substantial importance due to the high intensity of the magnetic field generated or produced by the heating coil.

For a more detailed description of the invention and for further objects and advantages thereof, reference is to be had to the following

2 description taken in conjunction with the accompanying drawings, in which:

Fig. 1 is a fractional elevation of an apparatus embodying the invention;

Fig. 2 is a plan view of Fig. 1;

Fig. 3 is a sectional view taken along the line 3—3 of Fig. 2; and

Fig. 4 is a plan view illustrating the invention as applied to a single mandrel.

Referring to the drawings, the invention has been illustrated as applied to a machine or apparatus for making pipe or tube bends of the type disclosed in the aforesaid Gaum and Zoeller patents. More specifically, a stationary frame including channel members 10 and 11 extends from a hydraulic mechanism which applies pressure to a series of tube or pipe blanks 12a—12e to force them over a shaping mandrel 13. The mandrel 13 is held against relative movement with respect to the tube blanks 12a—12e by means of a tie-rod 14 which is anchored to the stationary support forming a part of the hydraulic drive (not shown). In order to form each tube blank into a desired pipe or tube fitting, it is elevated in temperature by means of heating devices shown as comprising a preheat coil 15 and a mandrel coil 16. The preheat coil 15 is supported by a clamp 17 fastened together by means of bolts 18 and 19. From opposite sides of the clamp 17 there extend, Figs. 2 and 3, threaded studs 20 and 21 which pass through slots 22 and 23 in channel members 24 and 25. The preheat coil 15 may be adjusted lengthwise of the slots by loosening the lock-nuts 26 and 27, and the coil may be rotated or tilted about the axis of the studs 20 and 21. The mandrel coil 16 is mounted in manner identical with the preheat coil 15, similar clamping members 30 and 31, Fig. 4, together with their supporting studs 32 and 33, Fig. 2, being provided. However, to provide maximum clearance for the tube bends, the clamping bolt 19a is angularly displaced from the vertical, Fig. 1. As best shown in Fig. 2, the frame, including the channel members 24 and 25, is open at the end adjacent the mandrel but is closed at its opposite end by a channel member 34.

It is to be understood that a single hydraulic mechanism may be utilized with a single mandrel, such as 13, or a number of mandrels may be provided. As shown in Fig. 2, a second mandrel 38 is attached to a tie-rod 39 which has disposed thereover a second series of tube blanks 40a—40e with a preheat coil 41 and a mandrel coil 42 carried by a floating frame of construction identical with that described for the coils 15 and 16 and including members 24a, 25a and 34a. Each coil assembly and frame is supported in similar manner from the tube blank and tie-rod.

As shown in Fig. 3, there are provided semicircular members 43 and 44 which have corresponding ends carried by bolts 45 and 46 which extend through the elongated slots in channel members 24a and 25a. The semicircular members 43 and 44 are secured together by a bolt 47, insulated therefrom. From the intermediate portions of members 43 and 44, there extend supporting rods or members 49 and 50 carrying at their lower bifurcated ends thrust bearings or rollers 51 and 52. By means of nuts 53 and 54, the members 49 and 50 may be adjusted and held in any desired position. Similar semicircular members 43a and 44a are provided for the frame 24—25—34.

Each floating frame assembly, including the coils, is supported as a cantilever arm from bearing supports or rollers 56 and 57, Fig. 2, which are carried by a shaft 61 supported by end-bearings 58 and 59. To anchor each frame and yet to permit it to move about in any radial direction, a direction normal to the axial movement of the tube blanks, there is provided a universal joint 60 interconnecting the channel 34, Fig. 1, and a channel 62 forming a part of the stationary frame. The universal joint 60, which may be of conventional design, provides freedom of movement of the floating frame 24—25—34 in all directions except lengthwise of the tie-rod 14 and the mandrel 13. Accordingly, the coils 15 and 16 may, by suitable adjustment of the members 49 and 50, be centered with respect to the longitudinal axis of the tie-rod 14 and the tube blanks carried thereby. This predetermined and, preferably, concentric arrangement will then be maintained notwithstanding movements of the mandrel 13 and of the tie-rod in any and all directions. Accordingly, if there are developed forces which cause a tube blank to tend to move eccentrically through the coils or which may tend to strike against them, the floating frame 24—25—34 will follow such movement, keeping the coils centered about the particular tube blank and thus preventing the possibility of damage to either of the coils. The universal joint 60a performs like centering functions for the frame 24a—25a—34a.

Where a single mandrel is to be utilized, the bearings 58 and 59 may be mounted closer together to support a single roller 56, as illustrated in Fig. 4, the other parts thereof being the same as in Figs. 1 and 2 and having like reference characters.

In operation, the coils 15, 41, 31 and 42 are energized through suitable conductors, such as diagrammatically shown, Figs. 1 and 4, for coils 15 and 16. The tube blanks 12a—12e and 40a—40e are forced along the tie-rods 14 and 39 and over and around the respective mandrels 13 and 38. As each tube blank passes through the preheat coils 15 and 41, it is rapidly heated, and as it leaves one or the other of mandrel coils 31 and 42 its temperature is raised to within its plastic range, that is, the temperature at which the tube blanks may readily be shaped into the desired fittings. Accordingly, as it is forced over and around one of the mandrels 13 or 38 it is slightly expanded and curved to form an arcuate tube fitting or pipe bend of the desired curvature. When making tube fittings for return bends, a tube blank will be formed into a torus of approximately 200° to 220°, which allows extra material at each end for cropping and finishing of the torus shape into a 180° return bend or tube fitting. The pressure applied from the hydraulic mechanism is transmitted between the abutting ends of the several tube blanks. The faces of the tube blanks are not finished, although in general they are relatively flat. Nevertheless, due to slight misalignment at the abutting faces, and because of slight deformation of the abutting ends after they are elevated in temperature, components of force develop which may tend to move the cantilever-ends comprising the tube blanks, the mandrels, and the tie-rods which extend outwardly from the supporting rollers 56 and 57. Such relative movement may also be caused by displacement of the press other than along its normal straight path. The cantilever-ends may sometimes move about as much as several inches, whereas, the clearance between the inner surface of each coil is maintained quite small, of the order of one-eighth inch to one-half inch.

Notwithstanding the movement of the cantilever-ends, the coils 15—16 and 41—42 are maintained in fixed positions with respect to the cantilever-ends. There is no relative movement between them. The universal joints 60 and 60a anchor the open-ended frames axially of the cantilever-ends, while the arms 49 and 50 support the coils in fixed positions with respect to each tube blank as it passes therethrough. Moreover, the spacing of the coils may be varied not only axially of each tube blank but also angularly with respect thereto. In general, the preheat coils 15 and 41 will be disposed in planes generally normal to the axes of the tube blanks passing through them, while the mandrel coils 16 and 42 will in many cases be tilted, with the upper end, as viewed in Fig. 1, to the right of the illustrated position so that each coil may embrace more of the tube blank and mandrel, particularly along the initially enlarged portion thereof.

The arrangement also minimizes induction heating of the supporting elements since it will be observed that closed circuits have been avoided for traverse of induced currents. Since the arrangement is the same for each of the bolts which secures the clamping and supporting members together, a sectional view of only one of them, the sectional view of bolt 47, has been shown in Fig. 3. A separator or washer 62 of insulating material is disposed between the adjacent ends of the members 43 and 44. An insulating tube 63 encircles the shank of the bolt 47 while an insulating member or washer 64 is disposed beneath the head of the bolt 47. Thus, the supporting member 43 is electrically insulated from the member 44 and current may not circulate from one to the other.

While a preferred embodiment of the invention has been described, it will be understood that further modifications may be made within the spirit and scope of the invention as set forth in the appended claims.

What is claimed is:

1. In a system of forming tube fittings from tube blanks including means for forcing the tube blanks over a mandrel, the combination of means for supporting the mandrel and tube blanks approaching said mandrel as a cantilever, a pair of angularly disposed arms having adjacent ends thereof slidably engaging one of said tube blanks, a member interconnecting the opposite ends of said arms, a frame having a closed end and an open end, means connecting said member to said frame, and means including a universal joint for anchoring said frame in axially fixed relation with respect to said mandrel but permitting radial movement thereof in any direction, at least one electrical heating coil supported from said frame in a substantially fixed coaxial relation with each tube blank as it is forced toward and over said mandrel regardless of movement of said mandrel in any direction, and electrical conductors connected to said coil for flow of energizing current therethrough.

2. In combination, a heating device having a configuration for encircling an elongated member to be heated, means for linearly moving said member relative to said device progressively to heat said member, means including a stationary support forming a cantilever support for said elongated member and which determines the linear path of movement of said member, a floating frame having bearing means engaging said elongated member at spaced points along its periphery for holding said frame in predetermined spaced relation with respect thereto, means for supporting said heating device from said floating frame in encircling relation with said elongated member, and structure including a universal joint extending between said stationary support and said frame for holding said frame and said heating device in fixed axial position with respect to said elongated member and providing simultaneous radial movement of said frame and said device with radial movement of said stationary cantilever support and said elongated member.

3. The combination set forth in claim 8 in which said heating device is an electrically energized heating coil supported in coaxial relation with the elongated member for linear passage of said member through said coil in coaxial relation therewith.

4. In a tube-forming system in which tube blanks are successively moved along and coaxially of a tie-rod and over a mandrel connected to one end thereof, the combination of a bearing support engaging a tube blank for supporting as a cantilever the mandrel-end of said tie-rod and the tube blanks moving toward and coaxially of said mandrel, a floating frame including thrust members disposed for engagement with a tube blank at spaced points around its periphery to fix the location of the frame with respect to the axis of movement thereof, means including a universal joint for anchoring said frame in fixed position longitudinally of said mandrel-end of said tie-rod but permitting angular movement of said frame in all directions radially of said mandrel to maintain uniform the spacing of said frame with respect to tube blanks moving coaxially of and along said tie-rod toward said mandrel, and an electrically energized heating coil carried by said frame and encircling said tube blanks in concentric relation therewith for elevating the temperature of said tube blanks to a desired degree as they move toward and over said mandrel, said floating frame being effective to maintain said coil in coaxial relation with said tube blanks and said mandrel during radial movement thereof.

5. In a system of forming tube fittings from tube blanks including means for forcing heated tube blanks over a mandrel secured to the end of a tie-rod, the combination of a roller disposed beneath said tie-rod and spaced inwardly from the mandrel end thereof for supporting as a cantilever said outwardly extending tie-rod and mandrel, at least one electrical heating coil encircling said mandrel and said tube blanks and which upon current flow therethrough induces heating currents in said tube blanks for rapidly elevating the temperature of said tube blanks passing therethrough, supporting members for said coil each having an elongated slot therein for adjustment of said coil with respect to said mandrel, bearing means carrying said members and engaging one of said tube blanks at spaced points over its periphery for supporting said coil in predetermined spaced relation with said tube blanks, a stationary support, a universal joint secured at one end to said support and a rod connected to the other end of said joint and to said supporting members for anchoring said supporting members in fixed position longitudinally of said mandrel but permitting angular movement thereof in all directions to maintain uniform said spacing of said coil with respect to each tube blank passing therethrough.

6. In combination, a heating device having a configuration for encircling an elongated member to be heated, means for linearly moving said member relative to said device progressively to heat said member, means including a stationary support forming a cantilever support for said elongated member and which determines the linear path of movement of said member, a floating frame having bearing means in spaced relation with the heating means and engaging said elongated member at spaced points along its periphery for holding said frame in predetermined spaced relation with respect thereto, means for supporting said heating device from said floating frame in spaced and encircling relation with said elongated member, and structure including a universal joint extending between said stationary support and said frame for holding said frame and said heating device in fixed axial position with respect to said elongated member and providing simultaneous radial movement of said frame and said heating device with radial movement of said stationary cantilever support and said elongated member while maintaining said relationship between said heating device and said elongated member.

7. In combination, a heating device having a configuration for encircling an elongated member to be heated, means for linearly moving said member relative to said device progressively to heat said member, means including a stationary support forming a cantilever support for said elongated member and which determines the linear path of movement of said member, an open-ended floating frame having side members disposed in a horizontal plane and having angularly disposed bearing means engaging said elongated member at spaced points along its periphery, arms extending from the frame for supporting the bearing means and said frame, means for supporting said heating device from said side members of said frame in encircling and spaced relation with said elongated member, and structure including a universal joint extending between said stationary support and said frame for holding said frame and said heating device in fixed axial position with respect to said elongated member and providing simultaneous radial movement of said frame and said heating device with radial movement of said stationary cantilever support and said elongated member while maintaining said spaced relationship of said device and said elongated member.

PETER L. VISSAT.

REFERENCES CITED

The following references are of record in the file of this patent:

UNITED STATES PATENTS

| Number | Name | Date |
|---|---|---|
| 784,101 | Brinkman | Mar. 7, 1905 |
| 1,776,607 | Younghusband | Sept. 23, 1930 |
| 1,915,047 | Blakeslee | June 20, 1933 |
| 2,086,305 | Sessions | July 6, 1937 |
| 2,146,430 | Hazen | Feb. 7, 1939 |
| 2,180,513 | Fugill et al. | Nov. 21, 1939 |
| 2,205,681 | Caputo | June 25, 1940 |
| 2,273,809 | Kinzel | Feb. 17, 1942 |
| 2,335,495 | Fink | Nov. 30, 1943 |
| 2,370,485 | Nichols | Feb. 27, 1945 |
| 2,461,323 | Hille | Feb. 8, 1949 |